United States Patent
Zhou et al.

(10) Patent No.: US 11,703,258 B2
(45) Date of Patent: Jul. 18, 2023

(54) ELECTRONIC EXPANSION VALVE

(71) Applicant: Zhejiang Sanhua Intelligent Controls Co., Ltd., Shaoxing (CN)

(72) Inventors: Lei Zhou, Zhejiang (CN); Jiangnan Cai, Zhejiang (CN); Yingchong Lu, Zhejiang (CN)

(73) Assignee: Zhejiang Sanhua Intelligent Controls Co., Ltd., Shaoxing (CN)

( * ) Notice: Subject to any disclaimer, the term of this patent is extended or adjusted under 35 U.S.C. 154(b) by 701 days.

(21) Appl. No.: 16/603,916

(22) PCT Filed: Apr. 3, 2018

(86) PCT No.: PCT/CN2018/081703
§ 371 (c)(1),
(2) Date: Oct. 9, 2019

(87) PCT Pub. No.: WO2018/188500
PCT Pub. Date: Oct. 18, 2018

(65) Prior Publication Data
US 2020/0124327 A1    Apr. 23, 2020

(30) Foreign Application Priority Data
Apr. 12, 2017    (CN) .......................... 201710234824.9

(51) Int. Cl.
*F25B 41/35*    (2021.01)
*F16K 1/32*    (2006.01)
(Continued)

(52) U.S. Cl.
CPC ................ *F25B 41/35* (2021.01); *F16K 1/32* (2013.01); *F16K 1/50* (2013.01); *F16K 31/50* (2013.01)

(58) Field of Classification Search
CPC ... F16K 1/32; F16K 1/50; F16K 31/50; F25B 41/35
See application file for complete search history.

(56) References Cited

U.S. PATENT DOCUMENTS 5,964,449 A    10/1999    Goettel et al.
8,157,183 B2 *    4/2012    Hayashi .................. F25B 41/35
                                                          236/92 B
(Continued)

FOREIGN PATENT DOCUMENTS

CN    203009981 U    6/2013
CN    103291957 A    9/2013
(Continued)

OTHER PUBLICATIONS

Extended European Search Report for European Application No. 18784643.1, dated Nov. 18, 2020.
(Continued)

Primary Examiner — Mary E McManmon
Assistant Examiner — Andrew J Rost
(74) Attorney, Agent, or Firm — Wolf, Greenfield & Sacks, P.C.

(57) ABSTRACT

An electronic expansion valve includes a valve component and a stator component; the valve component includes a valve body assembly, a valve core, a threaded transmission assembly and a rotor; the valve body assembly is provided with a valve port, and the valve core is driven by the threaded transmission assembly to control an opening of the valve port; a wear-resistant coating is arranged on a contact surface of at least one of components having relative movement of the electronic expansion valve, the wear-resistant coating is applied by spraying, and the wear-resistant coating has a thickness of 5 to 8 microns; and the material of the
(Continued)

wear-resistant coating includes a molybdenum disulfide material and a polytetrafluoroethylene material.

7 Claims, 5 Drawing Sheets

(51) Int. Cl.
    *F16K 1/50*              (2006.01)
    *F16K 31/50*           (2006.01)

(56) References Cited

U.S. PATENT DOCUMENTS

| | | | |
|---|---|---|---|
| 8,297,588 B2* | 10/2012 | Ohuchi | F25B 41/34 251/129.13 |
| 8,556,229 B2* | 10/2013 | Lv | F16K 31/047 251/264 |
| 8,651,456 B2* | 2/2014 | Zhan | F25B 41/34 251/83 |
| 9,435,451 B2* | 9/2016 | Shen | F16K 17/36 |
| 9,506,677 B2* | 11/2016 | Lv | F16K 31/047 |
| 9,726,406 B2* | 8/2017 | Sekiguchi | F25B 41/35 |
| 2004/0188650 A1* | 9/2004 | Nalini | G05D 7/0635 251/129.11 |
| 2007/0163655 A1 | 7/2007 | Hunter | |
| 2014/0291562 A1* | 10/2014 | Ooe | F16K 31/04 251/129.11 |
| 2015/0121951 A1* | 5/2015 | Zhan | F25B 41/38 251/129.01 |
| 2016/0201811 A1 | 7/2016 | Hunter et al. | |

FOREIGN PATENT DOCUMENTS

| | | |
|---|---|---|
| CN | 103711925 A | 4/2014 |
| CN | 103711950 A | 4/2014 |
| CN | 105255349 A | 1/2016 |
| CN | 105333203 A | 2/2016 |
| CN | 206874939 U | 1/2018 |
| JP | H03-105781 U | 11/1991 |
| JP | H10-132093 A | 5/1998 |
| JP | 10205638 A | 8/1998 |
| JP | 2000-120885 A | 4/2000 |

OTHER PUBLICATIONS

Office Action for Japanese Application No. 2019-555223, dated Aug. 22, 2020.
International Search Report and Written Opinion for International Application No. PCT/CN2018/081703, dated Jun. 7, 2018.

\* cited by examiner

ELECTRONIC EXPANSION VALVE

This application is a national stage filing under 35 U.S.C. § 371 of International Patent Application Serial No. PCT/CN2018/081703, filed Apr. 3, 2018, which claims the priority to Chinese Patent Application No. 201710234824.9, titled "ELECTRONIC EXPANSION VALVE", filed on Apr. 12, 2017 with the National Intellectual Property Administration, PRC, the contents of each which is incorporated herein by reference in its entirety.

FIELD

The present application relates to a flow control valve, and in particular to an electronic expansion valve.

BACKGROUND

In a refrigeration system, an electronic expansion valve is mainly used to regulate the flow rate of refrigerant. With the increasing requirements for the flow control accuracy, the electronic expansion valve is gradually used in the automobile air conditioning systems, the heat pump systems and the battery cooling systems.

During the operation of the electronic expansion valve, there are wear and friction resistances between the components having relative movement, which adversely affects the service life and efficiency of the electronic expansion valve.

Therefore, there is a need to improve the conventional technology to address the above technical issues.

SUMMARY

An object of the present application is to provide an electronic expansion valve, which is beneficial to reducing the frictions between the components having relative movement, thereby increasing the service life of the electronic expansion valve.

In order to achieve the above object, the following technical solution is provided according to the present application. An electronic expansion valve includes a valve component and a stator component; the valve component includes a valve body assembly, a valve core, a threaded transmission assembly and a rotor; the valve body assembly is provided with a valve port, and the valve core is driven by the threaded transmission assembly to control an opening of the valve port; a wear-resistant coating is arranged on a contact surface of at least one of components having relative movement of the electronic expansion valve, the wear-resistant coating is applied by spraying, and the wear-resistant coating has a thickness of 5 to 8 microns; and the material of the wear-resistant coating includes a molybdenum disulfide material and a polytetrafluoroethylene material.

Compared with the conventional technology, by applying the wear-resistant coating including the molybdenum disulfide material and the polytetrafluoroethylene material onto the contact surface of the components having relative movement of the electronic expansion valve in the present application, it is beneficial to reduce the wear caused by the relative movement, reduce the friction resistance, and prolong the service life of the electronic expansion valve.

DETAILED DESCRIPTION OF EMBODIMENTS

The present application is further described below in conjunction with the accompanying drawings and specific embodiments:

In a refrigeration system, an electronic expansion valve is configured to control a flow rate of refrigerant, and the control of a superheat degree of the system is achieved by regulating the flow rate of the refrigerant. The electronic expansion valve is configured to control an opening according to an electric signal, thereby controlling the flow rate of the refrigerant. In order to improve the control accuracy of the flow rate, the electronic expansion valves are gradually used as throttle elements in fields like automobile air conditioning systems, heat pump systems and battery cooling systems.

Figure 1:
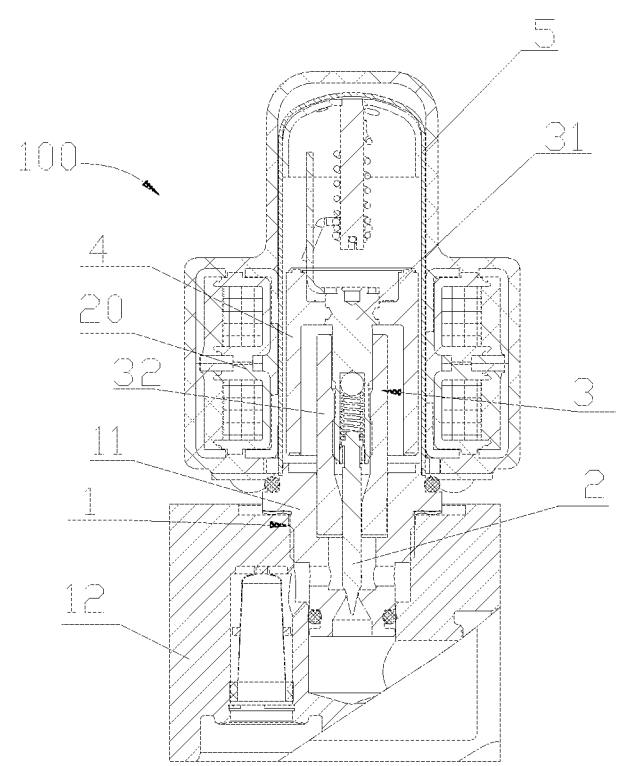
FIG. 1 is a schematic sectional view showing the structure of a first embodiment of the electronic expansion valve according to the present application.

Referring to FIG. 1, in this embodiment, an electronic expansion valve 100 includes a valve component 10 and a stator component 20. The stator component 20 is fixedly connected to the valve component 10. The valve component 10 includes a valve body assembly 1, a valve core 2, a threaded transmission assembly 3 and a rotor 4. The valve body assembly 1 is provided with a valve port, and the valve core 2 is driven by the threaded transmission assembly 3 to control an opening of the valve port. The threaded transmission assembly 3 includes a screw rod 31 and a nut 32. The screw rod 31 is connected to the rotor 4, and is configured to drive the valve core 2 to move. The nut 32 is fixed to a fixed portion of the valve component 10. The screw rod 31 and the nut 32 are in threaded connection, and the screw rod 31 moves relative to the nut 32, to drive the valve core 2 to move up and down, thereby controlling the opening of the valve port. A contact surface of at least one of the components having relative movement is coated with a wear-resistant coating. The wear-resistant coating is applied by spraying, and the material of the wear-resistant coating includes a molybdenum disulfide material and a polytetrafluoroethylene material. The wear-resistant coating has a thickness of 5 to 8 microns, so that the coating property, wear resistance and cost of the material can reach a reasonable range. The wear-resistant coating with such configuration is beneficial to reduce the wear of the components having relative movement and has a function of lubricating and reducing frictional resistances. Compared with lubricating oil, the wear-resistant coating is more uniform and does not change with pressure, and can better improve the wear resistance, which is beneficial to improve the service life of the components having relative movement, thereby improving the service life of the electronic expansion valve.

In this embodiment, the valve body assembly 1 includes a valve seat 11 and a valve main body 12. The valve port is formed in the valve seat 11, and a flow passage is formed in the valve main body 12. The valve core 2 changes the flow rate of a working medium in the flow passage by controlling the opening of the valve port. The valve seat 11 and the valve main body 12 are separately formed and are fixedly connected to each other, which is beneficial to simplify a forming process of the valve body.

In this embodiment, the components having relative movement at least include an external threaded portion 312 of the screw rod 31 and an internal threaded portion 323 of the nut 32; the valve port of the valve seat 11 and the valve core 2; and the nut 32 and the valve core 2. A relative moving surface of at least one of the components is coated with the wear-resistant coating. The wear-resistant coating is applied by spraying, the material of the wear-resistant coating includes a molybdenum disulfide material and a polytetrafluoroethylene material, and the wear-resistant coating has a thickness of 5 to 8 microns, so that the coating property, wear resistance and cost of the material can reach a reasonable range. In this embodiment, the screw rod 31 and valve core 2 are coated with the wear-resistant coating. The wear-resistant coating may also be applied to the corresponding components.

Figure 2:
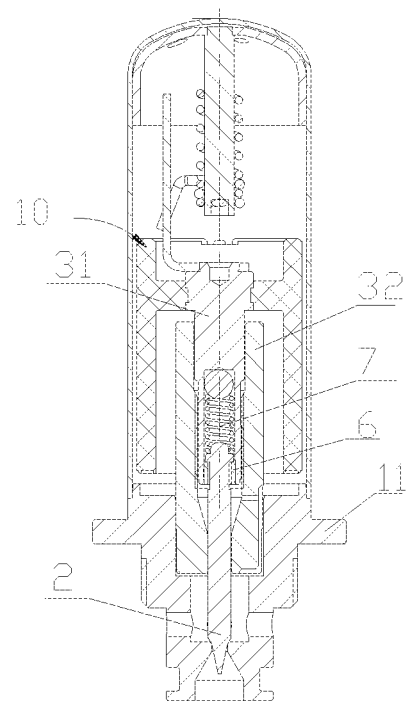
FIG. 2 is a schematic view showing the structure of an assembly of part of the components in FIG. 1.
Figure 3:
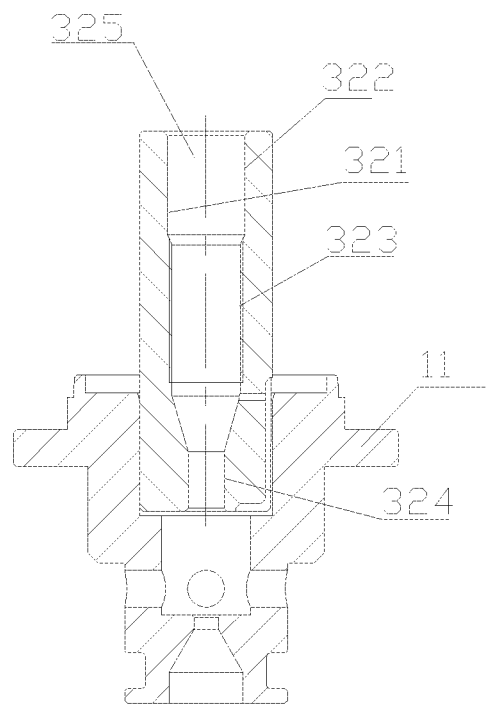
FIG. 3 is a schematic view showing the structure of an assembly of a valve seat and a nut in FIG. 2.

Referring to FIGS. 1, 2 and 3, in this embodiment, the nut 32 is fixedly connected to the valve seat 11, the valve seat 11 is fixedly connected to the valve main body 12, and the nut 32 is fixedly connected to a fixed portion of the valve body assembly 1, that is, the valve seat 11. The nut 32 includes an inner side wall 321, and the inner side wall 321 at least includes an upper guide portion 322, an internal threaded portion 323 and a lower guide portion 324. The inner side wall 321 forms a nut inner cavity 325. A caliber of the nut inner cavity 325 at the upper guide portion 322 is greater than the caliber of the nut inner cavity 325 at the internal threaded portion 323, and the caliber of the nut inner cavity at the internal threaded portion 323 is greater than the caliber of the nut inner cavity at the lower guide portion 324. The upper guide portion 322 is configured to guide the screw rod 31, the internal threaded portion 323 and the external threaded portion 312 of the screw rod are in threaded connection, and the lower guide portion 324 is configured to guide the valve core 2. The wear-resistant coating may be applied to the upper guide portion 322, the internal threaded portion 323 and the lower guide portion 324 of the nut, so that the wear resistance of the nut 32 in the three portions can be improved and the service life of nut 32 can be improved. In order to improve the coating process of the nut 32, the inner side wall 321 of the nut may also be uniformly sprayed with the wear-resistant coating. The wear-resistant coating may also be applied to the screw rod and the valve core at positions corresponding to the upper guide portion 322, the internal threaded portion 323 and the lower guide portion 324 of the nut.

Figure 4:
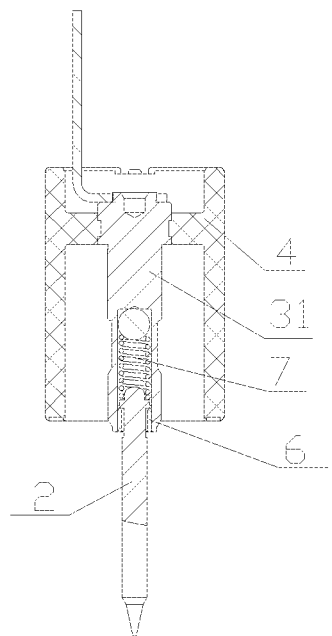
FIG. 4 is a schematic view showing the structure of an assembly of a valve core, a screw rod and a rotor in FIG. 2.
Figure 5:
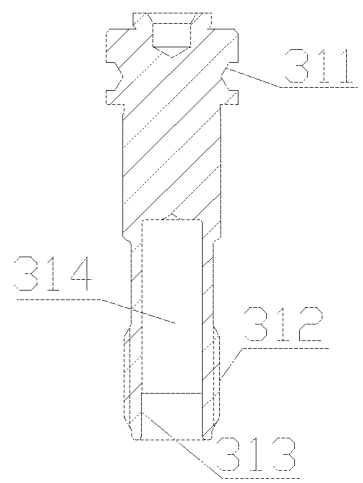
FIG. 5 is a schematic view showing the structure of the screw rod in FIG. 2.

Referring to FIGS. 2, 4 and 5, the screw rod 31 includes a rotor fixing portion 311, an external threaded portion 312 and a valve core connecting portion 313. The rotor fixing portion 311 of the screw rod 31 is fixed to the rotor 4 by injection molding. In this embodiment, the rotor fixing portion 311 and the external threaded portion 312 are arranged on the periphery of the screw rod 31, and the valve core fixing portion 313 is connected to the valve core 2. The external threaded portion 312 is coated with the wear-resistant coating to improve the wear resistance of the screw rod and prolong the service life of the screw rod, thereby prolonging the service life of the electronic expansion valve. The peripheral surface of the screw rod 31 between the rotor fixing portion 311 and the external threaded portion 312 is coated with the wear-resistant coating, such that the wear resistance of the screw rod is improved when the upper guide portion of the nut and the screw rod move relative to each other. The wear-resistant coating may be applied to the upper guide portion of the nut, and not applied to the peripheral surface of the screw rod between the rotor fixing portion 311 and the external threaded portion 312; or, the wear-resistant coating is applied to both the upper guide portion of the nut and the peripheral surface of the screw rod between the rotor fixing portion 311 and the external threaded portion 312.

Figure 6:
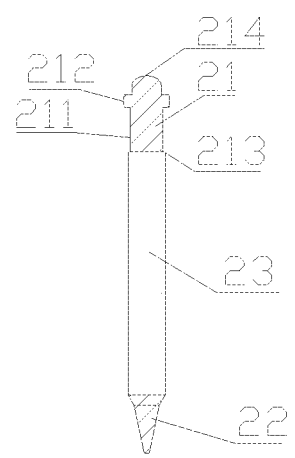
FIG. 6 is a schematic view showing the structure of the valve core in FIG. 2.

Referring to FIG. 6, the valve core 2 includes a first end portion 21, a second end portion 22 and a main body portion 23. The first end portion 21 is close to and includes a first tail end, and the second end portion 22 is close to and includes a second tail end. The first end portion 21 is connected to the screw rod 31, the second end portion 22 is configured to control the opening of the valve port, and the main body portion 23 is arranged between the first end portion 21 and the second end portion 22. Part of the main body portion 23 is arranged corresponding to the lower guide portion 324 of the nut 32. The first end portion 21, the second end portion 22 and the part of the main body portion 23 corresponding to the lower guide portion 324 are coated with the wear-resistant coating to increase the wear resistance of the valve core. A whole surface of the valve core may be coated with the wear-resistant coating for the convenience of coating. Of course, the wear-resistant coating may be applied to portions of the screw rod and the valve seat corresponding to the first end portion 21, the second end portion 22 and the part of the main body portion 23 corresponding to the lower guide portion 324, or the wear-resistant coating may be applied to the first end portion 21, the second end portion 22, the part of the main body portion 23 corresponding to the lower guide portion 324, and the corresponding portions of the screw rod and the valve seat.

In this embodiment, referring to FIGS. 1, 2 and 4, the valve component 10 includes a connecting bush 6. The positions of the screw rod 31 and the valve core 2 are limited via the connecting bush 6. The first end portion 21 of the valve core 2 includes an annular groove 211, a flange portion 212, a stepped portion 213 and the first tail end 214. The annular groove 211 is formed between the flange portion 212 and the stepped portion 213, a diameter of the annular groove 211 is smaller than a diameter of the stepped portion 213, and a diameter of the flange portion 212 is greater than the diameter of the stepped portion. A caliber of the connecting bush 6 is greater than the diameter of the stepped portion 213, and the caliber of the connecting bush 6 is smaller than the diameter of the flange portion 212. The annular groove 211 is configured to accommodate the connecting bush 6, and the flange portion 212 restricts the connecting bush from moving toward the first tail end 214. The connecting bush 6 is arranged around the periphery of the valve core from the second end portion and accommodated in the annular groove 211, and then the connecting bush 6 is pressed into the screw rod 31 and is in an interference fit with the screw rod 31, such that the connecting bush 6 is fixedly connected to the screw rod 31. The annular groove 211 and the flange portion 212 of the valve core 2 corresponding to the connecting bush 6 are coated with the wear-resistant coating, which improves the wear resistance of valve core 2 and prolongs the service life of valve core 2. The wear-resistant coating may be applied to portions of the connecting bush 6 corresponding to the annular groove 211 and the flange portion 212, or the wear-resistant coating may be applied to the annular groove 211 and the flange portion 212 of the valve core 2 corresponding to the connecting bush 6 and the corresponding portions of the connecting bush 6.

In this embodiment, a spring 7 is arranged between the screw rod 31 and the valve core 2. The screw rod 31 is formed with a screw rod inner cavity 314, and the first end portion 214 of the valve core 2 extends into the screw rod inner cavity 314. The first tail end 214 is in contact with the spring 7, and the flange portion 212 is pressed against an end surface of the connecting bush 6 by the spring 7, such that the spring 7 can serve as a buffer when the second end portion 22 of the valve core 2 comes into contact with the valve seat 11, protecting the valve core and prolonging the service life of the valve core. The first tail end 214 is coated with the wear-resistant coating, which reduces the friction between the first tail end and the spring, reduces the rotation of the valve core 2 with the spring 7, and further reduces the impact onto the valve port of the valve seat 11 caused by the valve core 2, thereby prolonging the service life of the valve seat 11 and the valve core 12.

In this embodiment, the valve body assembly 10 further includes a shield body 5, which isolates the stator component 20 from the rotor 4. The stator component 20 is arranged around the periphery of the shield body 5, and the rotor 4 is arranged inside an inner cavity of the shield body 5. The shield body 5 is fixed to the valve seat 11, so as to prevent the working medium from coming into contact with the stator component 20 and prevent the working medium from corroding the stator component. In this embodiment, the shield body 5 is fixed to the valve seat 11 by welding, which is beneficial to improve the sealing property. The shield body 5 may be fixed to the valve seat 11 in other ways, such as threaded connection and the like.

Figure 7:
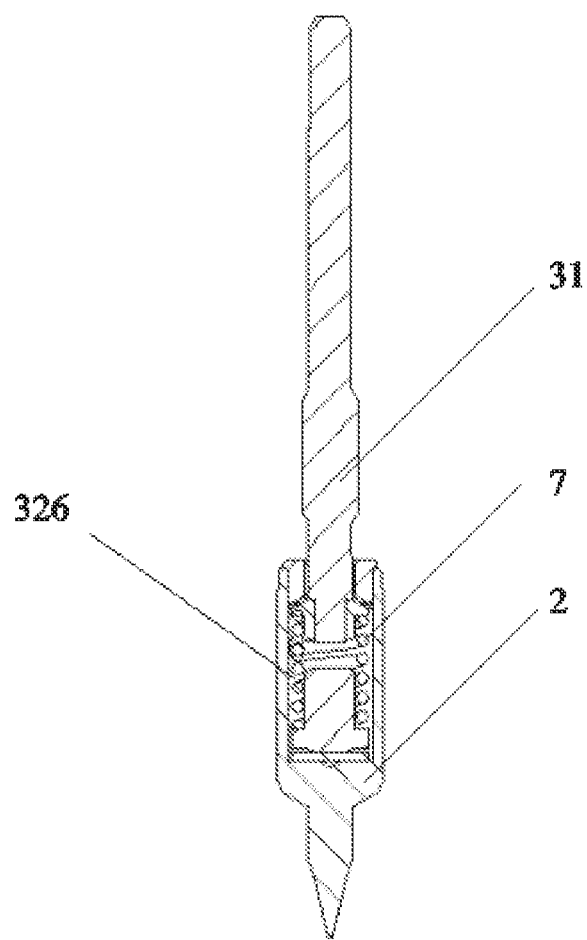
FIG. 7 is a schematic view showing an alternative structure of the screw rod and the valve core of the electronic expansion valve according to another embodiment of the present application.

The electronic expansion valve according to the present application may also be of other structures. For example, as is shown in FIG. 7, a spring (7) is arranged between the screw rod (31) and the valve core (2), the valve core (2) is formed with a valve core inner cavity (326), the spring (7) is arranged in the valve core inner cavity (326), one end of the spring (7) is in direct or indirect contact with the screw rod (31), and another end of the spring (7) is in direct or indirect contact with the valve core (2). At least one of a portion of the spring (7) in contact with the valve core (2) and a portion of the valve core (2) in contact with the spring (7) is coated with the wear-resistant coating and/or at least one of a portion of the spring (7) in contact with the screw rod (31) and a portion of the screw rod (31) in contact with the spring (7) is coated with the wear-resistant coating.

It should be noted that the above embodiments are only for illustrating the present application and are not intended to limit the technical solution described in the present application. Although the present application has been described in detail with reference to the embodiments described above, it should be understood by those skilled in the art that modifications or equivalent substitutions can still be made to the present application by those skilled in the art, and all the technical solutions and modifications thereof without departing from the spirit and scope of the present application fall within the scope of the appended claims.

The invention claimed is:

1. An electronic expansion valve, comprising a valve component and a stator component, wherein the valve component comprises a valve body assembly, a valve core, a threaded transmission assembly and a rotor, the valve body assembly is provided with a valve port, and the valve core is configured to be driven by the threaded transmission assembly to control an opening of the valve port; a wear-resistant coating is applied to a contact surface of at least one of parts of the valve component, having relative movement, of the electronic expansion valve, the wear-resistant coating is applied by spraying, the wear-resistant coating has a thickness of 5 to 8 microns, and a material of the wear-resistant coating comprises a molybdenum disulfide material and a polytetrafluoroethylene material, wherein the threaded transmission assembly comprises a screw rod and a nut, the screw rod is fixedly connected to the rotor, the screw rod is configured to drive the valve core to move, the nut is fixed to a fixed portion of the valve body assembly, the screw rod comprises an external threaded portion, the nut comprises an internal threaded portion, and the external threaded portion and the internal threaded portion are in threaded connection, and at least one of the external threaded portion and the internal threaded portion is coated with the wear-resistant coating, the nut further comprises a lower guide portion, the lower guide portion is arranged below the internal threaded portion, a caliber of the lower guide portion is smaller than a caliber of the internal threaded portion, the lower guide portion is configured to guide movement of the valve core, and at least one of the lower guide portion and an outer surface of a portion of the valve core corresponding to the lower guide portion is coated with the wear-resistant coating, wherein the nut comprises an inner side wall, an inner cavity of the nut is formed by the inner side wall, and the inner side wall further comprises an upper guide portion through which the screw rod runs, the internal threaded portion and the lower guide portion are formed on the inner side wall, the lower guide portion and the upper guide portion are respectively arranged at two sides of the internal threaded portion, a caliber of the upper guide portion is greater than the caliber of the internal threaded portion, and the upper guide portion is coated with the wear-resistant coating.

2. The electronic expansion valve according to claim 1, wherein the valve component further comprises a connecting bush, positions of the screw rod and the valve core are limited with respect to each other via the connecting bush, the screw rod is in an interference fit with the connecting bush, the screw rod is provided with a position-limiting portion, and the connecting bush is arranged at the position-limiting portion, at least one of a portion of the valve core that is in contact with the connecting bush and a portion of the connecting bush that is in contact with the valve core is coated with the wear-resistant coating.

3. The electronic expansion valve according to claim 2, wherein a spring is further arranged between the screw rod and the valve core, the spring is in direct or indirect contact with the screw rod and the valve core, at least one of a portion of the valve core that is in contact with the spring and a portion of the spring that is in contact with the valve core is coated with the wear-resistant coating.

4. The electronic expansion valve according to claim 3, wherein the screw rod comprises an inner side wall of the screw rod, a screw rod inner cavity is defined by the inner side wall, the spring is arranged in the screw rod inner cavity, one end of the spring is in contact with the screw rod, another end of the spring is in contact with a top of the valve core, and at least one of a portion of the spring that is in contact with the top of the valve core and the top of the valve core is coated with the wear-resistant coating.

5. The electronic expansion valve according to claim 4, wherein the screw rod comprises a rotor fixing portion fixed to the rotor, and an outer surface of the screw rod below the rotor fixing portion is coated with the wear-resistant coating.

6. The electronic expansion valve according to claim 3, wherein the valve core is provided with a valve core inner cavity, the spring is arranged in the valve core inner cavity, one end of the spring is in direct or indirect contact with the screw rod, and another end of the spring is in direct or indirect contact with the valve core; and wherein, at least one of a portion of the spring that is in contact with the valve core and a portion of the valve core that is in contact with the spring is coated with the wear-resistant coating, or, at least one of a portion of the spring that is in contact with the screw rod and a portion of the screw rod that is in contact with the spring is coated with the wear-resistant coating.

7. The electronic expansion valve according to claim 2, wherein at least one of a portion of the valve core that is in contact with the valve body assembly at the valve port and a portion of the valve body assembly that is in contact with the valve core at the valve port is coated with the wear-resistant coating.

\* \* \* \* \*